R. B. BENJAMIN.
LIGHTING DEVICE FOR AUTOMOBILES.
APPLICATION FILED SEPT. 17, 1917.
1,376,067.
Patented Apr. 26, 1921.
4 SHEETS—SHEET 1.
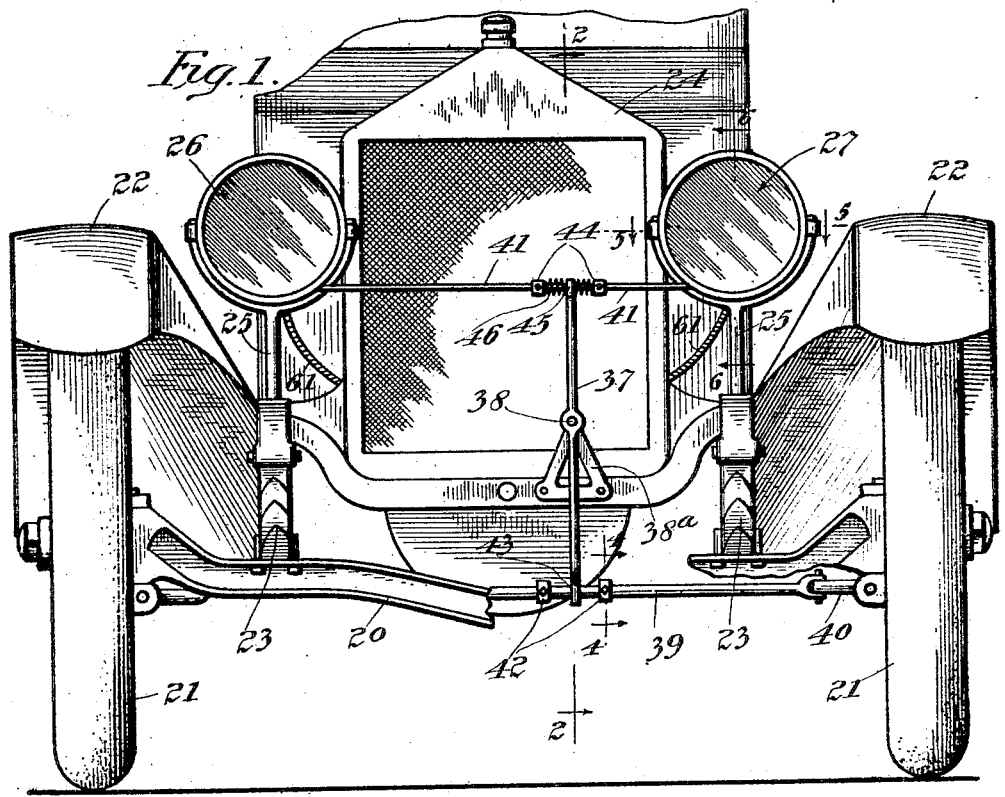
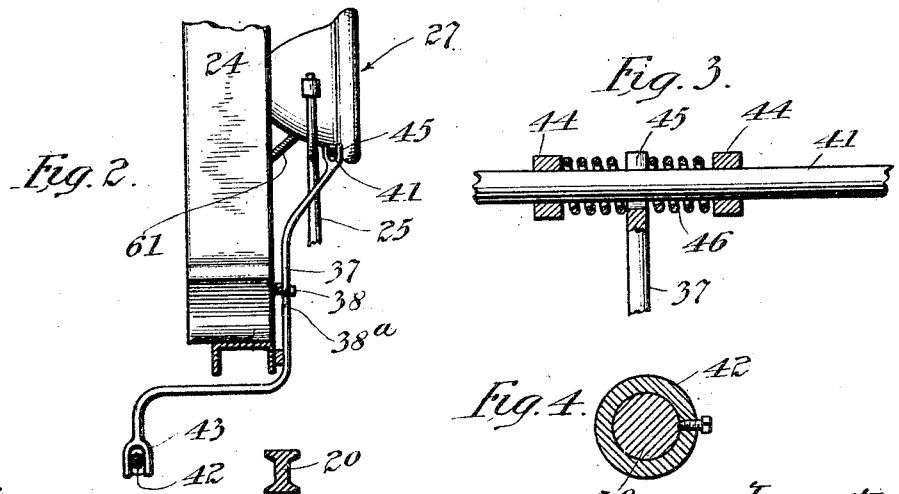

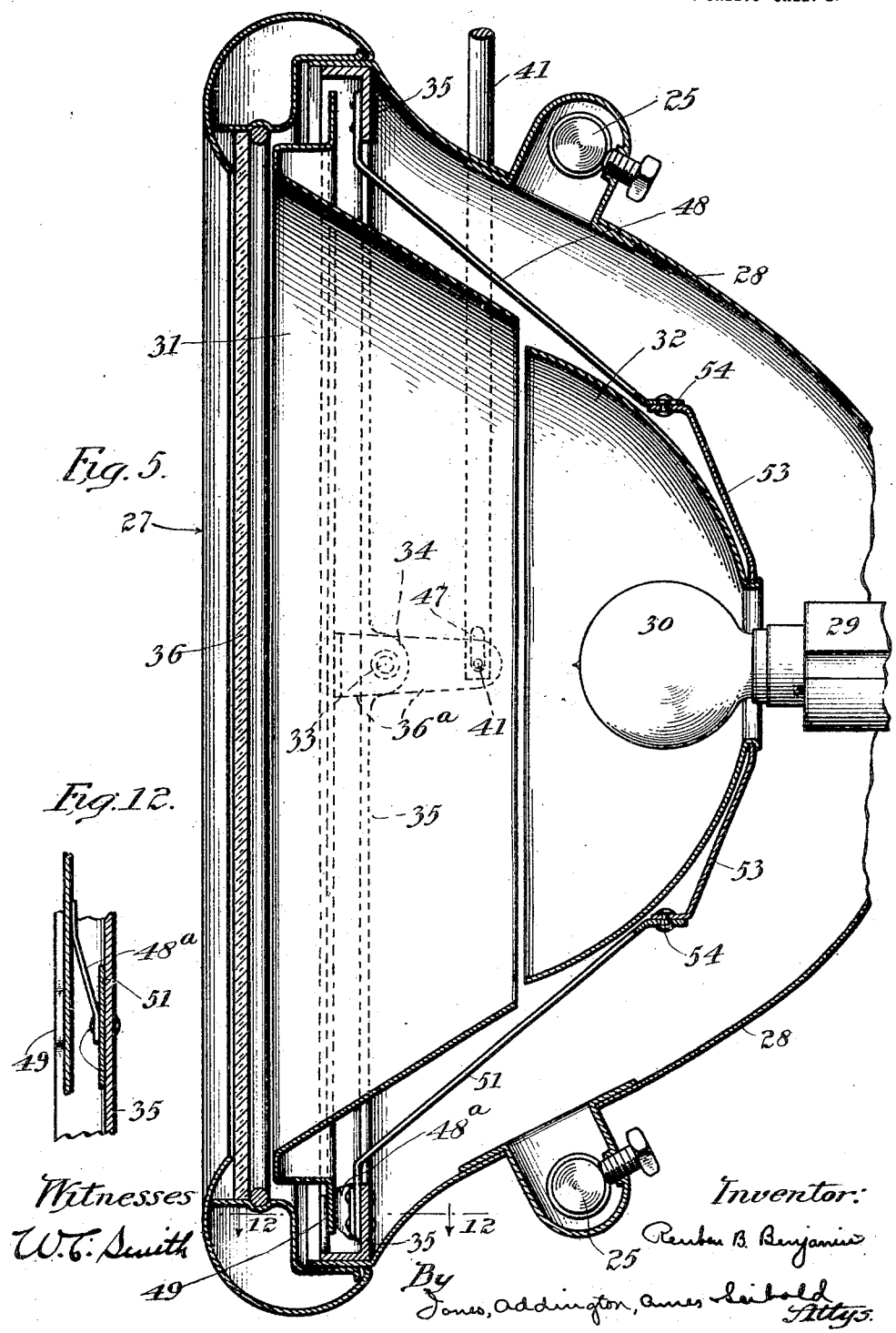

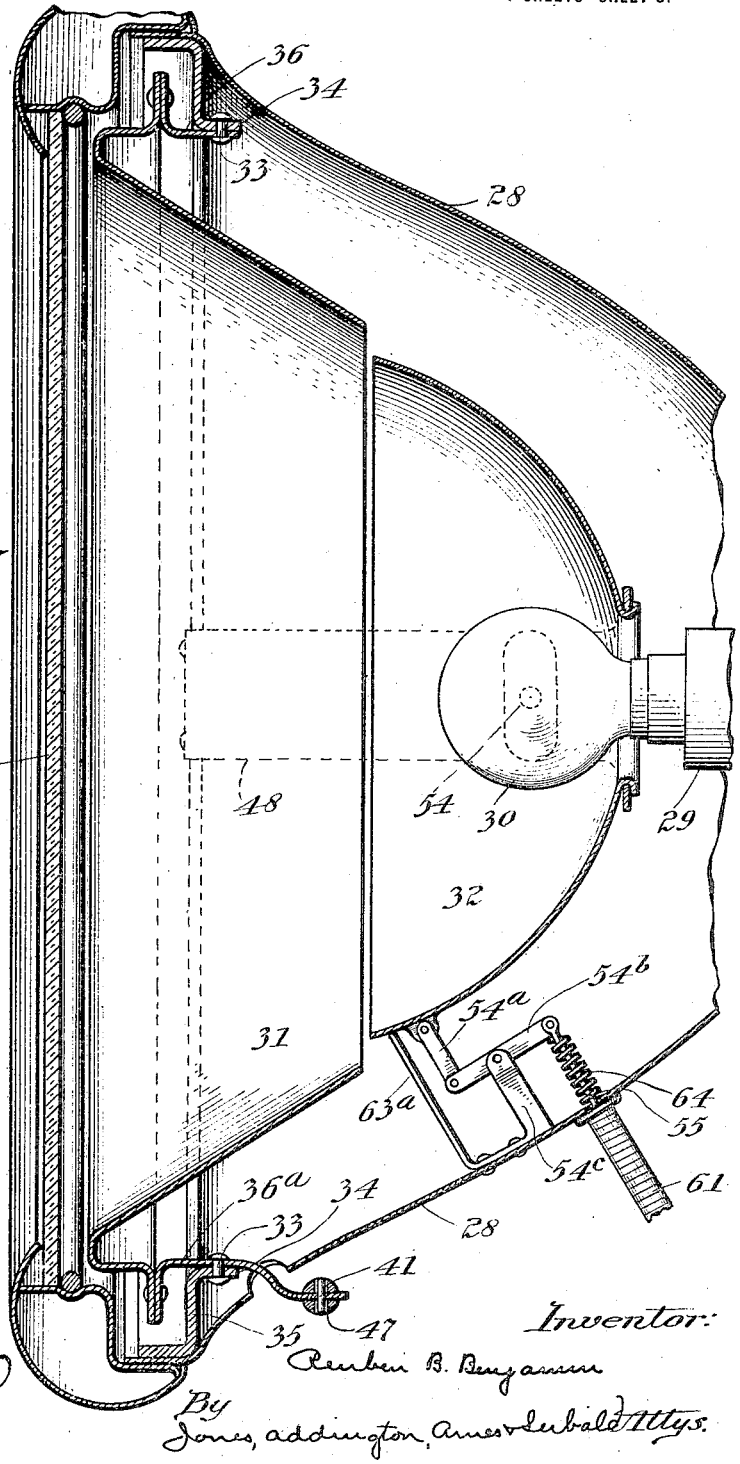

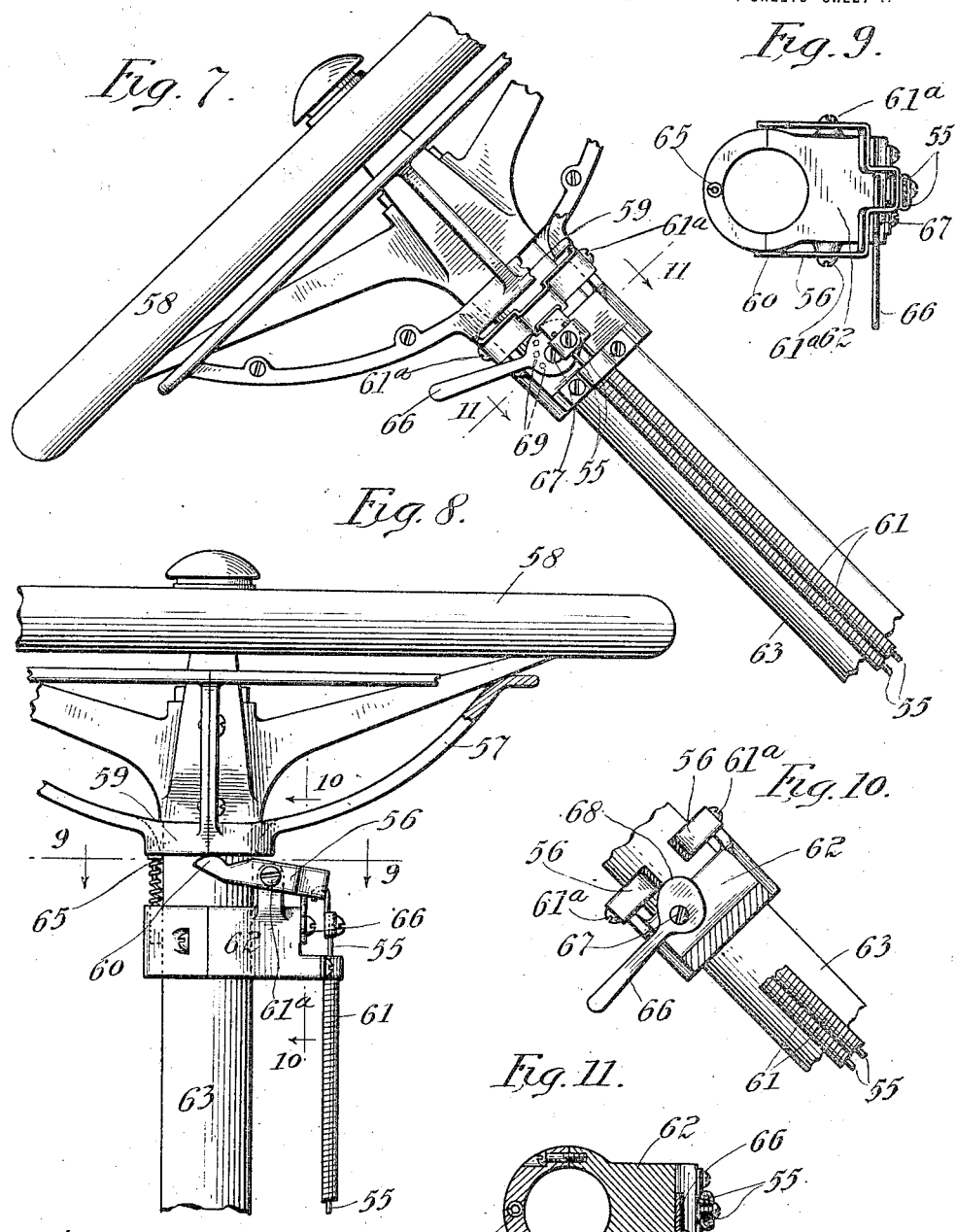

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

LIGHTING DEVICE FOR AUTOMOBILES.

1,376,067.  Specification of Letters Patent.  Patented Apr. 26, 1921.

Application filed September 17, 1917. Serial No. 191,856.

*To all whom it may concern:*

Be it known that I, REUBEN B. BENJAMIN, a citizen of the United States, residing at Chicago, in the county of Cook and State of Illinois, have invented new and useful Improvements in Lighting Devices for Automobiles, of which the following is a full, clear, concise, and exact description, reference being had to the accompanying drawing, forming a part of this specification.

My invention relates to lighting devices for automobiles.

One of the objects of my invention is to provide an improved lighting device whereby the light or a portion of it can be properly directed for turning, and whereby the light or a portion of it may be deflected so as not to cause a glare to dazzle the eyes of pedestrians or drivers of approaching vehicles. Further objects will appear from the detailed description to follow and from the appended claims.

In the drawings, in which one embodiment of my invention is shown—

Figure 1 is a front elevation of an automobile provided with my improved lighting device;

Fig. 2 is a section on the line 2—2 of Fig. 1;

Fig. 3 is an enlarged view of a detail of the connection between the steering gear and the lamp;

Fig. 4 is a section on the line 4—4 of Fig. 1;

Fig. 5 is a horizontal section on the line 5—5 of Fig. 1;

Fig. 6 is a vertical section on the line 6—6 of Fig. 1;

Fig. 7 is a side elevation of part of the steering wheel and post, showing the mechanism for controlling the tilting of the lamp;

Fig. 8 is another view of the steering wheel and post;

Fig. 9 is a section on the line 9—9 of Fig. 8;

Fig. 10 is a section on the line 10—10 of Fig. 8;

Fig. 11 is a section on the line 11—11 of Fig. 7; and

Fig. 12 is a section on the line 12—12 of Fig. 5.

Referring now to the drawings in detail, my invention is shown in connection with an automobile comprising the front axle 20, the front wheels 21, the fenders 22, the springs 23, the radiator 24, and the lamp-brackets 25.

The lamps 26, 27 mounted on the brackets 25 are similar in construction; each comprises an outer casing 28, which may be of sheet metal; a receptacle 29 for supporting an electric lamp 30 within the casing 28, an annular reflector member 31 pivotally mounted with respect to the casing 28 to swing about a substantially vertical axis, and a cup-shaped reflector member 32 pivotally mounted with respect to the casing member to swing about a substantially horizontal axis. The pivotal mounting of the annular reflector member 31 may be effected by means of pivot-pins 33 extending through lugs 34 struck up from the annular reinforcing member 35 for the casing 28, and two arms 36 and 36ª, respectively, secured to the rim of the annular reflecting member 31.

The swinging movement of the annular reflector member 31 is accomplished by means of a lever 37 pivotally mounted at 38 on a bracket 38ª, a reach-rod 39 connecting the steering knuckles 40 of the automobile for actuating the lever 37, and a rod 41 actuated by the lever 37 connected to the arm 36ª and acting on the annular reflector members 31 to swing them about the pivots 33.

In order to provide a lost-motion connection between the lever 37 and the rod 39, the latter is provided with a pair of abutments 42 located so as to engage the fork 43 of the lever 37 when the rod 39 is shifted in one direction or the other when turning.

In order to provide a yielding connection between the lever 37 and the rod 41, the latter is provided with a pair of abutments 44 between which and the fork 45 of the lever 37 are located coil-springs 46 surrounding the rod 41.

In order to provide a lost-motion connection between the lever 36ª and the rod 41, a pin and slot connection may be provided therebetween, as indicated at 47 (Fig. 5).

In order to return the annular reflector member after it has been operated by the rod 41, a leaf spring 48ª (Fig. 12) may be secured to the annular member 35, the free end of the spring bearing on the rim of the annular reflector member to normally hold it against a stop member 49 extending inwardly from the annular reinforcing member 35.

For suitably mounting the cup-shaped reflector member 32 it is provided with a pair of arms 53 pivotally secured at 54 to the arms 48 and 51, respectively, which are secured to the annular reinforcing member 35.

The mechanism for causing tilting movement of the cup-shaped reflector member 32 about the pivots 54 comprises a link 54ᵃ pivotally connected to the reflector member 32, a lever 54ᵇ pivotally connected to the link 54ᵃ and mounted on a bracket 54ᶜ, a flexible pull member 55, one end of which is secured to the lever 54ᵇ, a U-shaped lever 56 to which the other end of the pull member 55 is secured, and an operating wheel 57 located adjacent the steering-wheel 58 and mounted for tilting movement in any direction and having a hub portion 59 the under side of which engages the curved end 60 of the lever 56. The flexible pull member 55 may be a wire, as shown, operating in a flexible sheath 61. The lever 56 may be pivoted at 61ᵃ on a bracket 62 secured to the steering-post 63. The downward movement of the cup-shaped reflector member 32 may be limited by means of a stop member 63ᵃ, which may be formed integral with the bracket 54ᶜ.

For normally holding the cup-shaped reflector member 32 in its lowered position, springs 64 and 65 are provided, the spring 64 surrounding the pull member 55 (Fig. 6) and extending between the lever 54ᵇ and the casing 28, and the spring 65 extending between the lower face of the hub portion 59 and the upper face of the bracket 62 (Fig. 8).

In case it is desired to hold the cup-shaped reflector member 32 in a raised position, a lever 66 is provided pivoted at 67 to the bracket 62 and having a cam portion 68 the edge of which is located to engage the under side of the lever 56.

In order to hold the lever 66 in its various adjusted positions, it is provided on its inner face with a series of recesses 69 for engagement with a spring detent 70.

The use and operation of my improved device is as follows: The annular reflector member 31 is automatically swung about its vertical axis to give the desired light distribution when the vehicle is being turned. The cup-shaped reflector member 32 is normally deflected downwardly by the spring 64 in order to prevent the reflected light from being projected in a direction which will dazzle the eyes of pedestrians or other drivers.

In case it is desired to raise the reflector member 32 to throw a strong beam of light a long distance ahead, as in country driving or in illuminating a rise in the road, the operating wheel 57 is tilted, rocking the lever 56 and pulling on the wire 55 to tilt the lever 54ᵇ and raise the reflector member 32. The spokes of the steering-wheel 58 act as a fulcrum for the wheel 57 in its tilting movement. When the hand-wheel 57 is released the springs 64 and 65 will cause the hand-wheel 57 to return to a position in which its rim rests against all of the spokes of the steering-wheel 58.

If for any reason it is desired to hold the cup-shaped reflector member 32 in a raised position for a considerable length of time, the lever 66 is operated to release the outer end of the lever 56 to cause it to pull up on the pull member 55 to tilt the reflector member 32 upwardly. The spring detent 70 engages one of the depressions 69 in the inner face of the lever 66 to hold it in any desired adjusted position.

As the annular reflector member 31 receives a small portion of the reflected light as compared with a cup-shaped reflector portion 32 (probably not more than ten per cent. as much), the glaring effect will be prevented if the cup-shaped reflector member 32 is tilted downwardly. The light reflected by the annular reflector member 31 is, however, sufficient to provide the desired illumination in turning.

In turning, if the rod 39 is shifted far enough so that one of the stops 42 engages the fork 43 of the lever 37, the lever 37 is shifted to cause one end of the rod 41 to be moved in a direction to swing one of the annular reflector members 31 against the pressure of its spring 48ᵃ. The other end of the rod 41 has no effect on the annular reflector member 31, which it controls, the lost-motion connection between the rod 41 and the lever 36ᵃ permittting this action, and the stop 49 preventing the annular reflector member 31 from following up the rod 41. By means of this construction the annular reflector member 31 on the side toward which the vehicle is turning will be shifted to cause the reflected light to be directed in the direction in which the vehicle is turning.

I claim as new and desire to secure by Letters Patent of the United States:

1. A lighting device comprising a lamp support, an annular reflecting member, means for mounting said reflecting member for movement for varying the light distribution, a second reflecting member in the rear of and having substantially the same axis as said annular reflector, and means for mounting said second reflecting member for different movement for varying the light distribution.

2. A lighting device comprising a casing, an annular reflecting member pivotally mounted with respect to said casing on an axis, means for rotating said annular reflector on its pivotal axis, and a second reflecting member pivotally mounted to swing about an axis substantially perpendicular to the axis of rotation of said annular reflecting member.

3. A lighting device for automobiles comprising a casing, an annular reflecting member pivotally mounted with respect to said casing to swing about a substantially vertical axis, and a second reflecting member pivotally mounted to swing about a substantially horizontal axis.

4. The combination with an automobile of a lighting device comprising two reflecting members, means whereby the turning of the automobile will cause movement of one of said reflecting members, and means controlled by the driver of the vehicle for causing movement of the other reflecting member.

5. The combination with an automobile, of a lighting device comprising an annular reflecting member and a second reflecting member, means whereby the turning of the vehicle will cause the annular reflecting member to swing about a substantially vertical axis, and means controlled by the driver of the vehicle for causing the second reflecting member to swing about a substantially horizontal axis.

6. The combination with an automobile of a lighting device comprising two reflecting members, means whereby the turning of the automobile will cause one of said reflecting members to swing about a substantially vertical axis, and means controllable by the driver of the vehicle for causing the other reflecting member to swing about a substantially horizontal axis.

7. A lighting device for automobiles comprising two reflecting members, a common source of light for both of said reflecting members, means whereby the turning of the automobile will cause movement of one of said reflecting members, and means controlled by the driver of the vehicle for causing the movement of the other reflecting member.

8. A lighting device for automobiles comprising a casing, two reflecting members in said casing, means whereby the turning of the automobile will cause movement of one of said reflecting members, and means controlled by the driver of the vehicle for causing movement of the other reflecting member.

In witness whereof, I have hereunto subscribed my name.

REUBEN B. BENJAMIN.